US011625838B1

(12) United States Patent
Narapureddy et al.

(10) Patent No.: US 11,625,838 B1
(45) Date of Patent: Apr. 11, 2023

(54) END-TO-END MULTI-PERSON ARTICULATED THREE DIMENSIONAL POSE TRACKING

(71) Applicant: Amazon Technologies, Inc., Seattle, WA (US)

(72) Inventors: Dinesh Reddy Narapureddy, Pittsburgh, PA (US); Jean Laurent Guigues, Seattle, WA (US); Leonid Pishchulin, Seattle, WA (US); Jayakrishnan Kumar Eledath, Kenmore, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 28 days.

(21) Appl. No.: 17/218,476

(22) Filed: Mar. 31, 2021

(51) Int. Cl.
| | |
|---|---|
| G06T 7/246 | (2017.01) |
| G06T 7/73 | (2017.01) |
| G06K 9/62 | (2022.01) |
| G06N 3/02 | (2006.01) |
| G06V 10/40 | (2022.01) |
| G06V 40/10 | (2022.01) |

(52) U.S. Cl.
CPC ............ *G06T 7/246* (2017.01); *G06K 9/6215* (2013.01); *G06K 9/6256* (2013.01); *G06N 3/02* (2013.01); *G06T 7/73* (2017.01); *G06V 10/40* (2022.01); *G06V 40/10* (2022.01); *G06T 2207/20081* (2013.01); *G06T 2207/20084* (2013.01); *G06T 2207/30196* (2013.01)

(58) Field of Classification Search
None
See application file for complete search history.

(56) References Cited

U.S. PATENT DOCUMENTS

| | | | | |
|---|---|---|---|---|
| 9,514,390 | B2 * | 12/2016 | Bourdev | G06V 10/761 |
| 2010/0111370 | A1 * | 5/2010 | Black | G06V 10/763 |
| | | | | 705/26.1 |
| 2020/0380417 | A1 * | 12/2020 | Briancon | G06K 9/6264 |

(Continued)

OTHER PUBLICATIONS

Keep it SMPL: Automatic Estimation of 3D Human Pose and Shape from a Single Image. Bogo et al. (Year: 2016).*

(Continued)

*Primary Examiner* — Delomia L Gilliard
(74) *Attorney, Agent, or Firm* — K&L Gates LLP

(57) ABSTRACT

Devices and techniques are generally described for articulated three-dimensional pose tracking. In some examples, a plurality of frames of image data captured by one or more cameras may be received. First feature data representing the plurality of frames of image data may be determined using a backbone network. The first feature data may be projected into three-dimensional (3D) space. In some examples, 3D location data describing respective 3D locations of one or more persons represented by the first feature data projected in the 3D space may be determined. The first feature data and the 3D location data may be sent to a four-dimensional (4D) convolutional neural network (CNN). The 4D CNN may generate second feature data comprising respective 3D representations of the one or more persons. Three dimensional pose data representing articulated 3D pose information for the one or more persons may be generated.

20 Claims, 6 Drawing Sheets

(56) References Cited

U.S. PATENT DOCUMENTS

2022/0057856 A1* 2/2022 Sankhla .................... G06T 7/70
2022/0058827 A1* 2/2022 Montserrat .......... G06N 3/0454

OTHER PUBLICATIONS

SMPL: A Skinned Multi-Person Linear Model. Loper et al. (Year: 2015).*
Object Detection and Pose Estimation Using CNN in Embedded Hardware for Assistive Technology. Demby et al. (Year: 2019).*
Gold, et al.; Softmaxto Softassign: Neural Network Algorithms for Combinatorial Optimization; Journal of Artificial Neural Networks; 1996; 19 pgs.
Sigal, et al.; HumanEva: Synchronized Video and Motion Capture Dataset and Baseline Algorithm for Evaluation of Articulated Human Motion; International Journal of Computer Vision; Aug. 2009; pp. 4-27; 87(1).
Andriluka, et al.; Monocular 3d Pose Estimation and Tracking by Detection; IEEE Computer Society Conference on Computer Vision and Pattern Recognition; 2010; 8 pgs.
Amin, et al.; Multi-view Pictorial Structures for 3d Human Pose Estimation; British Machine Vision Conference, BMVC; 2013; 12 pgs.
Ionescu, et al.; Human3.6m: Large Scale Datasets and Predictive Methods for 3D Human Sensing in Natural Environments; IEEE Transactions on Pattern Analysis and Machine Intelligence; 2013; pp. 1325-1339; 36(7).
Belagiannis, et al.; Multiple Human Pose Estimation with Temporally Consistent 3D Pictorial Structures; ECCVw; 2014; 13 pgs; Springer Intl. Publishing; Switzerland.
Andriluka, et al.; 2D Human Pose Estimation: New Benchmark and State ofthe Art Analysis; Jun. 2014; 8 pgs.
Belagiannis, et al.; 3D Pictorial Structures Revisited: Multiple Human Pose Estimation; IEEE Transactions on Pattern Analysis and Machine Intelligence; 2015; 14 pgs; 38(10).
Joo, et al.; Panoptic Studio: A Massively Multiview System for Social Motion Capture; Proceedings ofthe IEEE International Conference on Computer Vision; 2015; pp. 3334-3342.
Milan, et al.; MOT16: A Benchmarkfor Multi-Object Tracking; May 3, 2016; 12 pgs.
Pishchulin, et al.; Deepcut: Joint Subset Partition and Labeling for Multi Person Pose Estimation; Proceedings of the IEEE Conference on Computer Vision and Pattern Recognition (CVPR); Jun. 2016; p. 4929-4937.
Martinez, et al.; A Simple Yet Effective Baseline for 3d Human Pose Estimation; Proceedings ofthe IEEE International Conference on Computer Vision; 2017; pp. 2659-2668.
Mehta, et al.; Monocular 3D Human Pose Estimation in the Wild Using Improved CNN Supervision; Fifth International Conference on 3D Vision (3DV); IEEE; 2017; pp. 506-516.
Newell, et al.; Associative Embedding: End-to-End Learning for Joint Detection and Grouping; 31$^{st}$ Conference on Neural Information Processing Systems; 2017; 11 pgs; Long Beach, CA.
Pavlakos, et al.; Harvesting Multiple Views for Marker-less 3D Human Pose Annotations; Proceedings of the IEEE Conference on Computer Vision and Pattern Recognition; 2017; pp. 6988-6997.
Vaswani, et al.; Attention is All you Need; Conference on Neural Information Processing Systems; Dec. 6, 2017; 15 pgs.
Moreno-Noguer; 3D Human Pose Estimation from a Single Image via Distance Matrix Regression; Proceedings ofthe IEEE Conference on Computer Vision and Pattern Recognition (CVPR); Jul. 2017; pp. 2823-2832.
Cao, et al.; Realtime Multi-Person 2D Pose Estimation Using Part Affinity Fields; Proceedings of The IEEE Conference on Computer Vision and Pattern Recognition (CVPR) Jul. 2017; pp. 7291-7299.
Zhou, et al.; Towards 3D Human Pose Estimation in the Wild: A Weakly-supervised Approach; Proceedings of the IEEE International Conference on Computer Vision (ICCV); Oct. 2017; pp. 398-407.
Battaglia, et al.; Relational Inductive Biases, Deep Learning, and Graph Networks; Oct. 17, 2018; 40 pgs.
Ershadi-Nasab, et al.; Multiple Human 3D Pose Estimation from Multiview Images; Multimedia Tools and Applications; 2018; pp. 15573-15601; 77(12).
Mena, et al.; Learning Latent Permutations with Gumbel-Sinkhorn Networks; Published as a conference paper at ICLR2018; 2018; 22 pgs.
Xiao, et al.; Simple Baselines for Human Pose Estimation and Tracking; Aug. 21, 2018; 17 pgs.
Zanfir, et al.; Monocular 3D Pose and Shape Estimation of Multiple People in Natural Scenes—The Importance of Multiple Scene Constraints; The Computer Vision Foundation; 2018; pp. 2148-2157.
Zanfir, et al.; Deep Network for the Integrated 3D Sensing of Multiple People in Natural Image; Conference on Neural Information Processing Systems 2018; 10 pgs; vol. 31; Curran Associates, Inc.,.
Andriluka, et al.; Pose Track: A Benchmark for Human Pose Estimation and Tracking. Proceedings of the IEEE Conference on Computer Vision and Pattern Recognition (CVPR), Jun. 2018; pp. 5167-5176.
Pavlakos, et al.; Ordinal Depth Supervision for 3D Human Pose Estimation; Proceedings ofthe IEEE Conference on Computer Vision and Pattern Recognition (CVPR); Jun. 2018; pp. 7307-7316.
Mehta, et al.; Single-shot Multi-person 3D Pose Estimation from Monocular RGB; Sixth International Conference on 3D Vision (3DV); 2018; p. 120-130.
Cheng, et al.; Occlusion-aware Networks for 3D Human Pose Estimation in Video; 2019 IEEE/CVF International Conference on Computer Vision (ICCV), 2019; p. 723-732.
Moon, et al.; Camera Distance-aware Top-down Approach for 3D Multi-person Pose Estimation from a Single RGB Image; The IEEE International Conference on Computer Vision (ICCV); 2019; p. 10133-10142.
Dong, et al.; Fast and Robust Multi-Person 3D Pose Estimation from Multiple Views; Proceedings ofthe IEEE Conference on Computer Vision and Pattern Recognition; Jan. 14, 2019; 10 Pgs.
Duan, et al.; CenterNet: Keypoint Triplets for Object Detection; Proceedings of the IEEE International Conference on Computer Vision; 2019; pp. 6569-6578.
Joo, et al.; Towards Social Artificial Intelligence: Nonverbal Social Signal Prediction in a Triadic Interaction; Proceedings of the IEEE Conference on Computer Vision and Pattern Recognition; 2019; pp. 10873-10883.
Pavllo, et al.; 3D Human Pose Estimation in Video with Temporal Convolutions and Semi-supervised Training; Proceedings of the IEEE Conference on Computer Vision and Pattern Recognition; 2019; pp. 7753-7762.
Qui, et al.; Cross View Fusion for 3D Human Pose Estimation; International Conference on Computer Vision (ICCV); 2019; p. 4342-4351.
Sun, et al.; Deep High-resolution Representation Learning for Human Pose Estimation; CVPR; 2019; p. 5693-5703.
Kreiss, et al.; Composite fields for human pose estimation; Proceedings of the IEEE/CVF Conference on Computer Vision and Pattern Recognition (CVPR), Jun. 2019; pp. 11977-11986.
Bridgeman, et al.; Multi-Person 3D Pose Estimation and Tracking in Sports; The IEEE Conference on Computer Vision and Pattern Recognition (CVPR) Workshops; Jun. 2019; 10 pgs.
Habibie, et al.; In the Wild Human Pose Estimation Using Explicit 2D Features and Intermediate 3D Representations; Proceedings of the IEEE/CVF Conference on Computer Vision and Pattern Recognition (CVPR); Jun. 2019; pp. 10897-10906.
Iskakov, et al.; Learnable Triangulation of Human Pose; International Conference on Computer Vision (ICCV); Oct. 2019; p. 7718-7727.
Cheng, et al.; 3D Human Pose Estimation Using Spatio-temporal Networks with Explicit Occlusion Training; 2020; 8 Pgs.
Kadkhodamohammadi, et al.; A generalizable approach for multi-view 3D Human Pose Regression; Machine Vision and Applications; 2020; 14 pgs; 32(1).

(56) References Cited

OTHER PUBLICATIONS

Mehta, et al.; XNect: Real-time Multi-Person 3D Motion Capture with a Single RGB Camera ACM Trans. Graph; Jul. 2020; 17 pgs; vol. 39 No. 4.

Tu, et al.; VoxelPose: Towards Multi-Camera 3D Human Pose Estimation in Wild Environment; ECCV; 2020; 16 pgs.

Sarlin, et al.; SuperGlue: Learning Feature Matching with Graph Neural Networks; Proceedings of the IEEE/CVF Conference on Computer Vision and Pattern Recognition; 2020; p. 4938-4947.

Vo, et al.; Automatic Adaptation of Person Association for Multiview Tracking in Group Activities; Transaction On Pattern Analysis and Machine Intelligence; 2020; 14 pgs.

Li, et al.; Cascaded Deep Monocular 3D Human Pose Estimation with Evolutionary Training Data; Proceedings of the IEEE/CVF Conference on Computer Vision and Pattern Recognition (CVPR); Jun. 2020; 6173-6183.

Wang, et al.; Combining Detection and Tracking for Human Pose Estimation in Videos; Proceedings of the IEEE/CVF Conference on Computer Vision and Pattern Recognition (CVPR); Jun. 2020; pp. 11088-11096.

\* cited by examiner

US 11,625,838 B1

END-TO-END MULTI-PERSON ARTICULATED THREE DIMENSIONAL POSE TRACKING

BACKGROUND

Accurately estimating three-dimensional ("3D") human poses from two-dimensional ("2D") image data is a challenging task in computer vision. Methods for 3D pose prediction are typically classified into model-free and model-based approaches. Typically, model-free approaches directly learn a mapping from 2D reference points to 3D joints. Model-based approaches often fit 3D parametric models such as the skinned multi-person linear ("SMPL") representation to estimate 3D shape and pose. This is typically done by minimizing the 2D error between the projection of the predicted 3D pose in the 2D space and the given 2D reference points.

DETAILED DESCRIPTION

Figure 1:
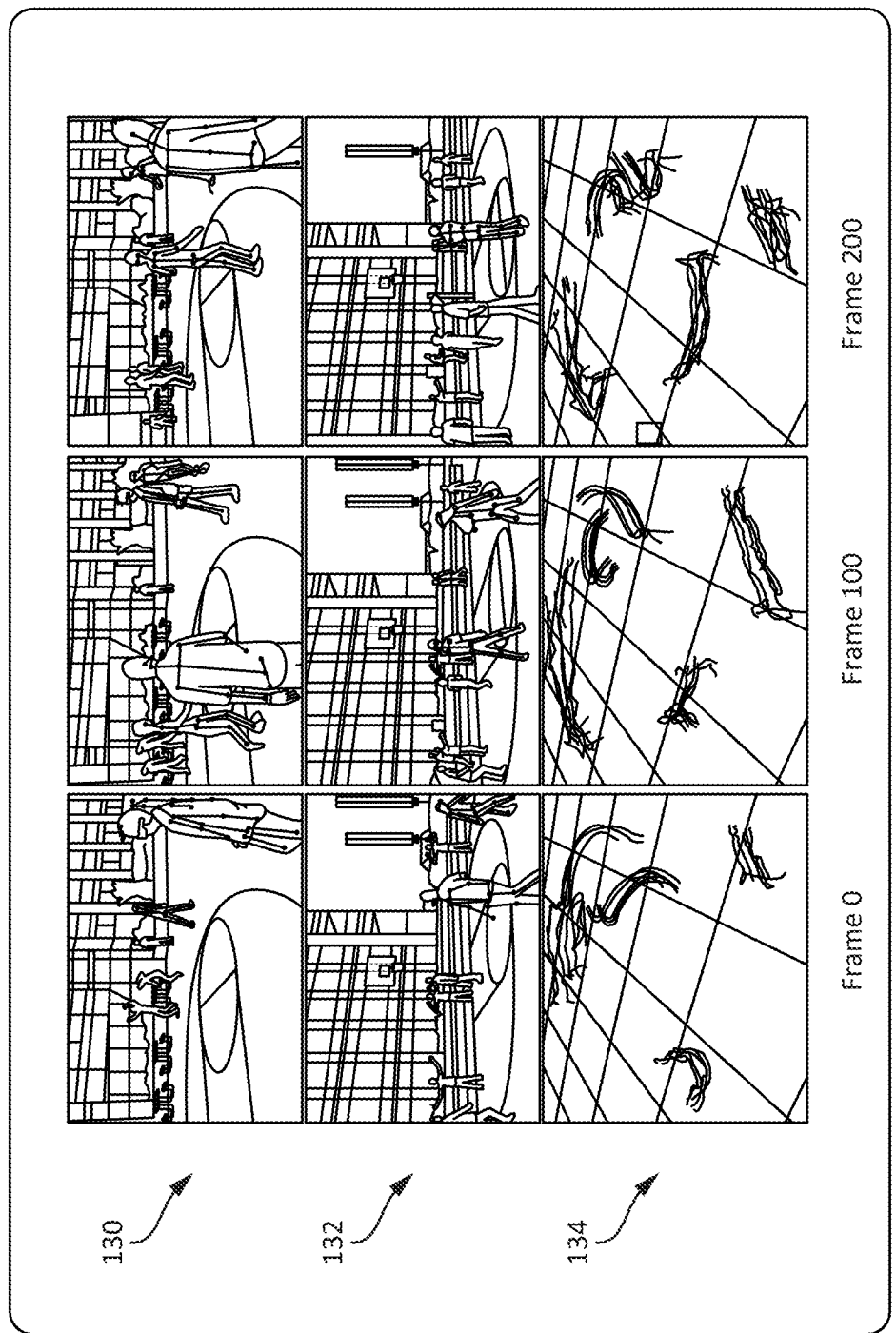
FIG. 1 is an illustration of multi-person articulated 3D pose tracking, according to various aspects of the present disclosure.
Figure 1:
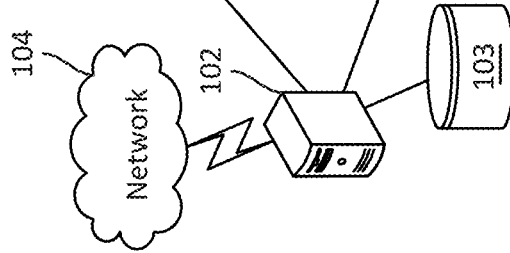

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Described herein are techniques for three dimensional (3D) pose estimation and tracking of one or more people seen in an arbitrary number of camera feeds. Various top-down approaches are described effective to simultaneously determine multiple individuals' 3D body joint reconstructions and associations in space and time in a single end-to-end learnable framework. In various examples, a spatio-temporal formulation is described that operates in a common voxelized feature space aggregated from single or multiple camera views. In some examples described herein, a person detection step is followed by a four dimensional (4D) convolutional neural network (CNN) that generates short-term person-specific representations that are then linked across time using a differentiable matcher component. The linked descriptions are then merged and deconvolved into 3D poses. This joint spatio-temporal formulation contrasts with previous piecewise strategies that treat 2D pose estimation, 2D-to-3D lifting, and 3D pose tracking as independent sub-problems that are error-prone when solved in isolation. Furthermore, unlike previous methods, end-to-end systems described herein are robust to changes in the number of camera views and may achieve highly accurate results even if a single view is available at inference time.

Described herein are various approaches for 3D tracking and reconstructing of articulated poses of multiple individuals seen in an arbitrary number of camera feeds. This task comprises identifying people in the scene, reconstructing their 3D body joints into consistent skeletons, and associating 3D body joints over time. No assumptions are made on the number of available camera views. Various techniques described herein are able to accurately track articulated 3D poses of multiple individuals even when the input camera feeds includes such real-world scenarios as multiple close-by interacting individuals, fast body motions, self- and person-person occlusions, etc. A key challenge in such scenarios is that people might significantly overlap and expose only a subset of body joints due to occlusions or truncations by image boundaries, resulting in a more difficult reconstruction and tracking of articulated 3D human poses. Many multi-view strategies rely on multi-stage inference to first estimate 2D poses in each frame, cluster same person poses across views, reconstruct 3D poses from pose clusters based on triangulation, and finally link 3D poses over time. However, solving each step in isolation is sub-optimal and is prone to errors that cannot be recovered in later stages. This is particularly true for monocular methods where solving each step in isolation often represents an ill-posed problem.

In the various examples, a spatio-temporal formulation is described that operates in a common voxelized feature space obtained by casting per-frame deep learning features from single or multiple views into a discretized 3D voxel volume. A 3D CNN is used to localize each person in the voxel volume. Then, a fixed spatio-temporal volume around each person detection is processed by a 4D CNN to compute short-term person-specific representations for each detected person. Overlapping representations at neighboring time steps are further scored based on attention aggregation and linked using a differentiable matcher. Finally, 3D body joints of the same person are consistently predicted at each time step based on merged person-specific representations. Notably, all components are implemented as layers in a single feed-forward neural network and are thus jointly learned end-to-end. Various machine learning techniques are described herein. However, although different layers and/or components of machine learning models are described, the different machine learning components may be implemented in a single machine learning model or in multiple machine learning models, depending on the desired implementation. For example, a network 204 and a 4D CNN 211 are described, among other networks, in FIG. 2. However, these networks may be implemented as separate machine learning models or as layers and/or components of a single CNN, depending on the desired implementation.

In some examples, the spatio-temporal formulation allows simultaneous 3D body joint reconstruction and tracking of multiple individuals. In contrast to some past multi-person 3D pose estimation approaches that aggregate per frame information in 3D voxel space, the techniques described herein are able to perform multi-person 3D pose tracking using end-to-end person-specific representation learning. As previously described, the various techniques described herein do not make assumptions on the available number of camera views and performs reasonably well even in the purely monocular setting. In contrast to some prior multi-person 2D pose tracking methods that rely on short-term spatio-temporal representation learning, the approaches described herein operate on the aggregated spatio-temporal voxel volume and provides a richer hypothesis comprising of tracked 3D skeletons.

Various techniques described herein represent a novel learnable tracking formulation that allows extending person-specific spatio-temporal representation learning to arbitrarily-long sequences. In contrast to previous approaches that use a heuristic pairwise tracking score based on poses distance and perform matching using the Hungarian method, various examples described herein use an attention aggregation layer and a differentiable representation matching layer based on the Sinkhorn algorithm. In various examples, person-specific representations are matched instead of the determined body pose tracklets, allowing learning of more expressive representations. In various examples, the proposed learnable tracking formulation not only improves tracking accuracy but also improves joint localization.

In some examples, a novel framework for the evaluation of multi-person articulated 3D pose tracking is described. Experimental evaluation on the Panoptic dataset has shown that the various systems and techniques described herein achieve significant improvements in per-joint tracking accuracy compared to strong baselines.

Single Person 3D Pose Estimation methods can be subdivided into multi-view and monocular approaches. Multi-view approaches often rely on triangulation of per view 2D poses to determine a 3D pose. To improve robustness to 2D pose estimation errors, some approaches jointly reason over 2D poses seen from multiple viewpoints. Some monocular approaches typically lean on powerful neural networks to mitigate the ambiguity of recovering 3D from 2D joint locations. In some examples, 3D poses may be directly regressed from 2D joint locations using deep networks. While being quite simple, such approaches suffer from inaccuracies of 2D joint localization and the fact that appearance is not used during 3D pose prediction. Some other approaches have attempted to overcome these limitations by predicting 3D volumetric representations from images. In some examples described herein, per-frame deep learning features are cast from single or multiple views into a common discretized space. However, in the approaches described herein, a more challenging problem of multi-person 3D pose tracking is addressed. 4D spatiotemporal volumes are processed to compute person-specific representations that allow to predict spatially and temporally consistent skeletons of multiple people.

Multi-person 3D Pose Estimation methods typically split the problem into 2D joint grouping in single frames and 3D pose reconstruction. 2D grouping is done using bottom-up or top-down strategies. In multi-view scenarios, recent approaches typically rely on triangulation of 2D poses of the same individual to reconstruct 3D poses, while earlier methods extend pictorial structures model to deal with multiple views. Independently solving 2D pose estimation, multi-view matching and triangulation are prone to errors. Some previous approaches project per view 2D joint heatmaps into a voxelized 3D space and directly detect people and predict their 3D poses in this space. Monocular approaches encode 2D and 3D pose features and jointly decode 3D poses of all individuals in the scene. Encoding the pose for all joints/limbs of the full-body, regardless of available image evidence, leads to potential encoding conflicts when similar body parts of different subjects overlap. Described herein are various techniques that cast per-frame feature maps into a voxelized 3D space and follow a top-down approach which starts with detecting people in the voxel space. However, in various embodiments described herein, a more challenging problem of multi-person 3D pose tracking is addressed. This problem requires reasoning in spatio-temporal volumes extracted around person detections and merging extracted person-specific representations to reliably reconstruct and track 3D skeletons in arbitrarily long sequences. In contrast to previous approaches, various systems and techniques described herein can operate in a purely monocular setting. However, unlike previous monocular approaches, techniques described herein do not suffer from encoding conflicts, since feature maps are cast into a common voxelized 3D space.

Multi-Person 3D Pose Tracking

In some examples, this problem has been addressed using a multi-view approach that follows a multi-stage inference where 2D poses are first predicted per frame, same person 2D poses are triangulated across views to recover 3D poses which are finally linked over time. In contrast, the various techniques described herein operate in a common spatio-temporal volume, are end-to-end learnable, and are not restricted to the multi-view setting only. The techniques described herein do not make assumptions about the type of body motions or people activities and address a harder problem of multi-person articulated 3D pose tracking. Additionally, in contrast, to previous approaches that resort to a piece-wise trainable strategy, the techniques described herein are end-to-end trainable and thus can propagate people detection, tracking, and pose estimation errors back to input image pixels. Furthermore, the techniques described herein seamlessly incorporates additional views, if available, to boost accuracy.

Joints and/or joint data, as described herein may correspond to anatomical human joints (e.g., elbow joint, shoulder joint, etc.), but may also include, in at least some cases other points on the human form that are not traditionally described as joints. For example, a system may use 17 joints including {'nose', 'left eye', 'right eye', 'left ear', 'right ear', 'left shoulder', 'right shoulder', 'left elbow', 'right elbow', 'left wrist', 'right wrist', 'left hip', 'right hip', 'left knee', 'right knee', 'left ankle', 'right ankle'}. Other systems and/or implementations may use other joints (sometimes referred to as "key points") apart from those noted in the foregoing example. In 3D different limbs (e.g., defined as the connections between two joins) may be articulated in various directions in 3D space. The various systems and techniques described herein are effective to perform multi-person articulated 3D pose tracking.

Machine learning techniques are often used to form predictions, solve problems, recognize objects in image data for classification, etc. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model may be referred to as back propagation.

FIG. 1 is an illustration of multi-person articulated 3D pose tracking, according to various aspects of the present disclosure. As depicted in FIG. 1, computing device(s) 102 may include a non-transitory computer-readable memory 103 and/or may be configured in communication with non-transitory computer-readable memory 103, such as over network 104. In various examples, network 104 may represent a local area network (LAN) and/or a wide area network (WAN) such as the internet. Computing device(s) 102 may be effective to execute various models and/or algorithms described herein in order to implement system 200 (FIG. 2).

In the example depicted in FIG. 1, the top two rows 130, 132 portray the projections of keypoints on two different camera views, while the bottom row 134 shows the 3D pose tracking over time. As shown, the tracking of multiple people in a natural setting (e.g., moving around a basketball court) is smooth accounting for moving cameras over a relatively long duration of time (e.g., 200 frames).

Figure 2:
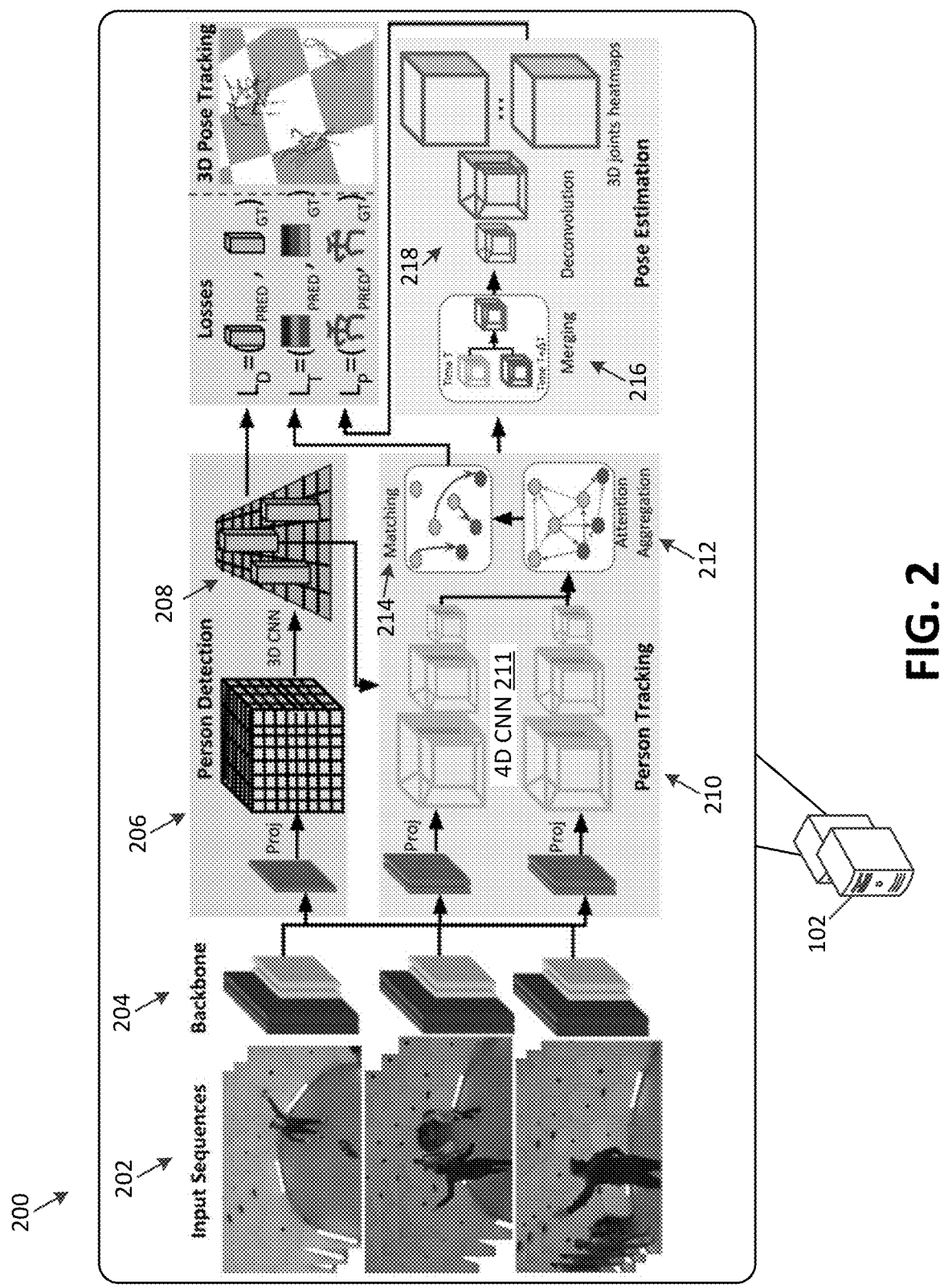
FIG. 2 depicts an example end-to-end multi-person articulated 3D pose tracking system, in accordance with various aspects of the present disclosure.

FIG. 2 depicts an example end-to-end multi-person articulated 3D pose tracking system 200, in accordance with various aspects of the present disclosure. To learn person tracking and pose estimation in 3D system 200 uses multiple differentiable layers with intermediate supervisions. System 200 is made up of three main blocks, each one with an associated loss. The first block is a person detection network 206 in 3D voxel space. Given person detections 208, a 4D CNN 211 of a person tracking network 210 extracts a spatio-temporal representation (e.g., feature data comprising spatial contextual information and temporal contextual information) of each detected person over a short period of time. In order to track people, an assignment problem is solved between the set of descriptors for two frames t and t+Δt. All matched descriptors which overlap are then merged (merging 216) into a single descriptor which is finally deconvolved (deconvolutions 218) into a 3D pose for the person tracked at central frame. Merging 216 may combine the descriptors (e.g., feature representations) received from person tracking 210.

Person Detection Network

System 200 begins with a multi-view person detection network (PDN) 206 trained to detect people in 3D at a specific time instance. For example, HRNet may be a CNN that is used as a network 204 for extracting image-based features at each input frame of input sequences 202. HRNet may be a network that generates human pose estimation data. The pre-final layer of the backbone network 204 may be used and the feature representations may be passed through a single convolution layer to convert the feature representation into a feature map of size R. The feature maps coming from all the camera views are then aggregated into a 3D voxelized volume by an inverse image projection method. The voxel grid is initialized to encompass the whole space observed by the cameras. Using the camera calibration data, each voxel center is projected into the camera views. All the feature vectors picked in image space may be aggregated by concatenating them and passing through a shallow network with a softmax layer. This produces a unique feature vector of size R. Thus the output is a data structure of size R×W×H×D dimensions, where W, H, D are the dimensions of the voxel grid and R is the dimension of the feature maps. 3D Convolutions are then applied to this volume to generate detection proposals (e.g., person detections 208). For each person, we train the network to detect its "center," which is defined as the midpoint between neck and center of the hips of the person. The loss at each time t is expressed directly as a distance between the expected heatmap and the output heatmap, similarly to the CenterNet approach, except that this framework is in 3D instead of 2D:

$$L_D^t = \sum_{w=1}^{W}\sum_{h=1}^{H}\sum_{d=1}^{D} \|V_{Pred}^{w,h,d} - V_{GT}^{w,h,d}\| \tag{1}$$

Non-maximum suppression (NMS) is applied on the 3D heatmaps and only the detections with large scores are retained. The person detection loss represents differences between ground truth location data (e.g., ground truth center data indicating the center of the person) and the center detected by person detections 208.

Spatio-Temporal Descriptors and Tracking

For each detected person a spatio-temporal volume of fixed dimension is generated that is centered on the person center. 4D CNN 211 is used to produce a short time description of each person around the detection frame. This spatiotemporal volume is referred to herein as a tesseract as it is a 4D volume of size R×T×X×Y×Z, where T is the size of the temporal window and X, Y, Z are the dimensions of the cuboid centered on the detected person. The goal of extending the volume in time around the detection frame is twofold. First, using a temporal context allows better estimation of the joint positions in the central frame, and extrapolation/interpolation of occluded joints or to handle pose or appearance ambiguities in a single frame. Second, extending a person's description in time generates a descriptor which overlaps the descriptors extracted for adjacent times, hence producing descriptors that can be matched by similarity for tracking purposes.

Tesseract Convolutions. The input to this sub-network is the output of the HRNet (or other backbone network 204) pre-final layer which is cast in 3D at each time stamp (e.g., at each frame or other time step). The same procedure is followed as for the person detection network 206 to generate the features for each time instance of the tesseract. The tesseract is then passed through multiple 4D convolutions and max pooling layers of 4D CNN 211 to produce a reduced size tesseract feature. These features represent a spatio-temporal descriptor of a person centered around a detection. This bottleneck descriptor is used in both the tracking and pose estimation modules.

Figure 3:
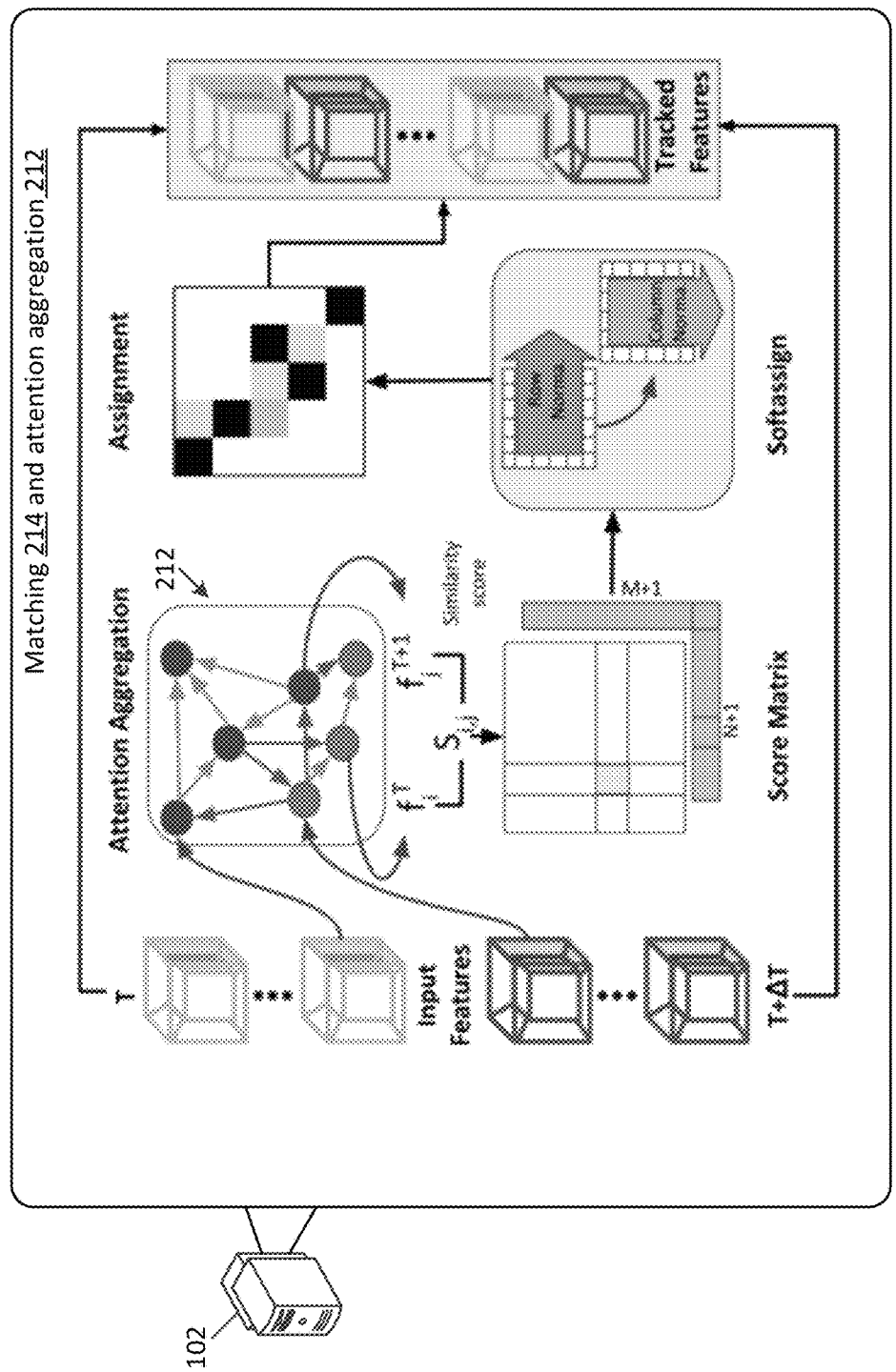
FIG. 3 depicts further detail regarding an attention aggregation component and a matching component of the end-to-end multi-person articulated 3D pose tracking system of FIG. 2, in accordance with various aspects of the present disclosure.

FIG. 3 depicts further detail regarding a component effective to perform attention aggregation 212 (e.g., a component comprising an attention mechanism) and a component effective to perform matching 214 of the end-to-end multi-person articulated 3D pose tracking system of FIG. 2, in accordance with various aspects of the present disclosure.

Attention Aggregation 212. Before temporal matching 214 (FIG. 2) the features are passed into a Graph Neural Network (GNN) to integrate contextual cues and improve the features distinctiveness. Two types of undirected edges may be used: 1) self edges, connecting features belonging to the same time instance, and 2) cross edges, connecting features from adjacent time instances. A learnable message passing formulation may be used to propagate the information in the graph. The resulting multiplex network begins with a high-dimensional state for each node and computes, at each layer, an updated representation by simultaneously aggregating messages across all incident edges for all nodes.

Let $^{(l)}x_i^t$ be the intermediate representation for element i at time instance t at layer l. The message $m_{\epsilon \rightarrow i}$ is the result of the aggregation from all features of persons j: $(i,j) \in \epsilon$, where $\epsilon \in \epsilon_{self}, \epsilon_{cross}$. The input may be passed through multiple message passing updates to generate final matching descriptors given as linear projections. These are given as $f_i^t = W \cdot {}^{(L)}x_i^t + b$. for features at time t and $f_i^{(t+\Delta t)} = w \cdot {}^{(L)}x_i^{t+\Delta t} + b$. at time t+Δt, where W are the weights learned for the GNN.

Temporal Matching Layer (matching 214) The final features of the attention aggregation 212 are passed through a trained matching layer (e.g., matching 214), which produces an assignment matrix. For a given time instance t, consider the features of N and M persons at time t and t+Δt, respectively. As in the bipartite graph matching formulation, an optimal assignment P is a permutation matrix that maximizes the total score $\Sigma_{i,j} S_{i,j} P_{i,j}$ where $S \in R^{M \times N}$ is a score matrix. The similarity $S_{i,j}$ between the descriptor i at time t and the descriptor j at time t+Δt may be computed using the inner product between descriptors $S_{i,j} = \langle f_i^t, f_j^{(t+\Delta t)} \rangle$. As opposed to learned visual descriptors, the matching descriptors are not normalized, and their magnitude can change as per the feature during training to reflect the prediction confidence.

To let the network suppress some predicted persons (false detections) and to handle changes in the number of persons in the scene, each set may be augmented with a dustbin so that matching is always computed on a fixed length feature vectors. This leads to optimal assignments for each available detection and the rest of the unassigned dustbins always correspond one-to-one with the next time instance.

The Softassign algorithm may be used to solve the assignment problem by a differentiable operator. The Softassign algorithm is based on Sinkhorn iterative matrix balancing, which projects an initial score matrix into a doubly stochastic matrix by iteratively normalizing the matrix along rows and columns. When applied to the matrix $\exp(S^-/\tau)$, it has been shown that Sinkhorn balancing corresponds to solving an entropy regularized problem which converges to the optimal assignment solution as τ goes to 0. The Softassign algorithm can be efficiently implemented on a graphical processing unit (GPU) by unrolling a fixed number of Sinkhorn iterations. After T=100 iterations, a final score matrix P is generated and the association for the detection i at time t is then extracted as $\arg \max_j P_{i,j}$.

Since all of the above layers are differentiable, the tracking module may be trained in a supervised manner with respect to the ground truth associations. Given ground truth associations G between time t and t+Δt, the objective function (e.g., defining tracking loss $L_T^t$ to be minimized is the log likelihood of the assignment P:

$$L_T^t = -\sum_{(i,j) \in G} \log P_{i,j} \quad (2)$$

3D Pose Estimation

Returning to FIG. 2, the last module of the network (pose estimation) computes the persons' 3D poses using the persons descriptors and their tracking information.

Spatio-temporal descriptors merging 216. If T is the tesseract temporal window size, then after tracking a person for T frames, T spatio-temporal descriptors of this person are obtained which overlap at a common time and encode the person's pose and motion over a total time interval of length 2T−1. All these descriptors may be merged to estimate the person's pose at their common time. As previously described, a softmax-based merging strategy may be used and the result is a single tesseract description for the central frame.

Tesseract deconvolution 218. The merged tesseract is finally passed through multiple 4D deconvolution layers during deconvolution 218 to produce a vector of 3D heatmaps of the person's joints at time t. If $T_{pred}^q$ denotes the 3D heatmap obtained for the joint q, the predicted joint position $k_{pred}^q$ is obtained by a soft-argmax operator, i.e. by a heatmap scores-weighted average of the voxel centers.

In various examples, two loss functions may be combined for the pose estimation task: a L1 distance computed on the keypoints positions and a loss on the response of the heatmap at the ground truth joint position:

$$L_P^{t,d} = \sum_{q=1}^{Q} [\|k_{Pred}^q - k_{GT}^q\|_1 - \beta \cdot \log(T_{Pred}^q(k_{GT}^q))], \quad (3)$$

where Q is the number of joints. In the end, the system 200 may be trained end-to-end to minimize the sum of the three losses defined above over time, the person detection loss $L_D^t$, the tracking loss $L_T^t$ and the pose prediction loss $L_P^{t,p}$:

$$L = \sum_{t \in D} \left[ L_D^t + \alpha L_T^t + \gamma \sum_{p \in TP(t)} L_P^{t,p} \right], \quad (4)$$

where D is the total duration of the sequence and TP(t) represent the true positive detections at time t. The gradient is propagated back to the initial images, including through the HRNet backbone which is shared by the detection module and the tracking+pose estimation modules. As used herein, "end-to-end" refers to training each machine learning component of the system 200 to minimize the sum of the three losses (equation (4)), as opposed to individually training the components based on only the loss function related to that component.

Figure 4:
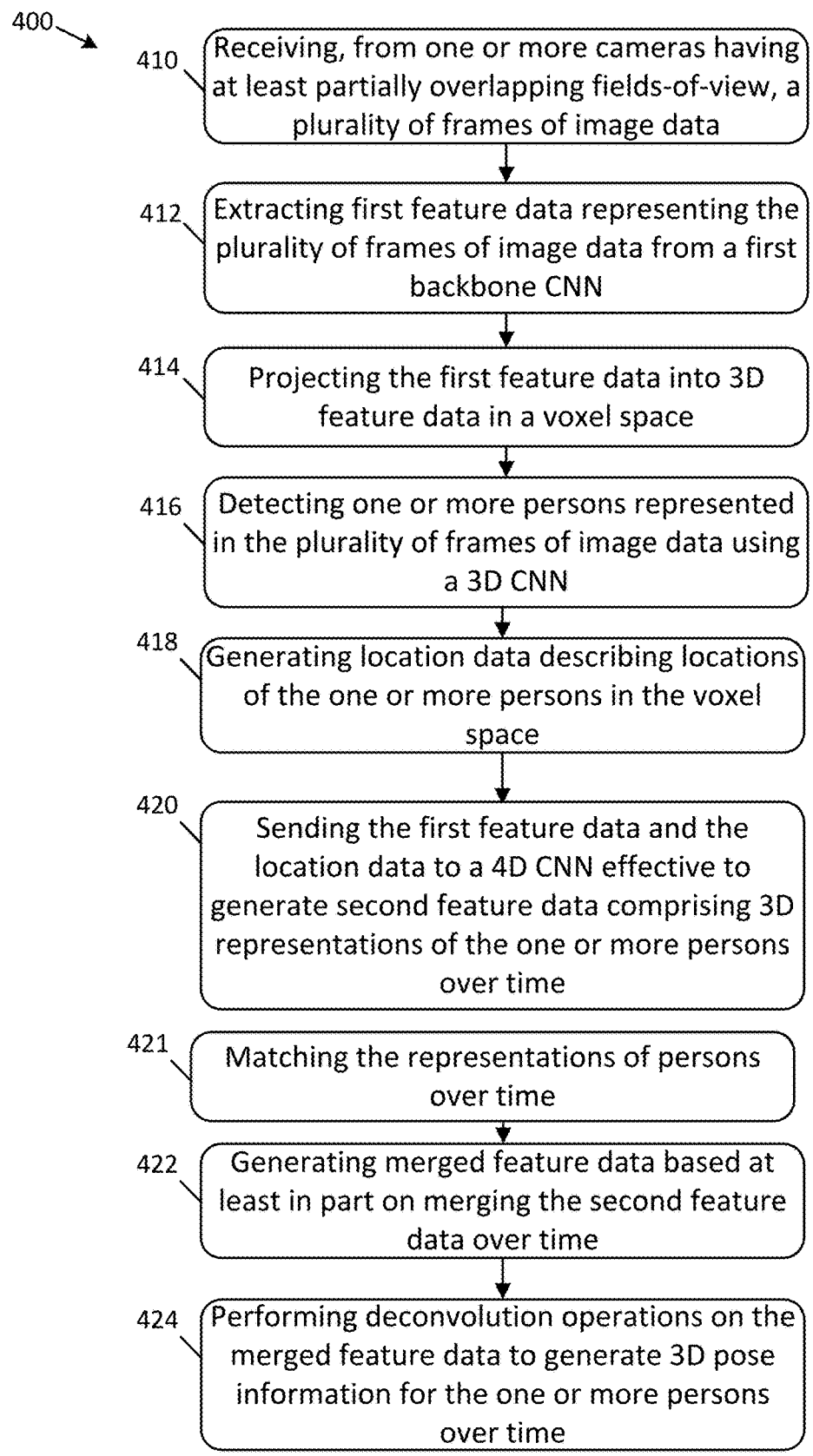
FIG. 4 depicts an example process for multi-person articulated 3D pose tracking, in accordance with various aspects of the present disclosure.

FIG. 4 depicts an example process 400 for multi-person articulated 3D pose tracking, in accordance with various aspects of the present disclosure. Those portions of FIG. 4 that have been previously discussed in reference to FIGS. 1-3 may not be described again for purposes of clarity and brevity. The actions of the process 400 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 400 may begin at action 410, at which a plurality of frames of image data may be received. In various examples, there may be multiple cameras capturing the plurality of frames of image data. In such cases, the multiple cameras may have at least partially overlapping fields-of-view. However, as previously described, in other examples, there may only be a single camera (e.g., the monocular case) that provides the plurality of frames of image data. In some examples, the frames of image data may depict one or more persons moving about within an environment.

Process 400 may continue to action 412, at which first feature data may be extracted that represents the plurality of frames of image data. In various examples, the first feature data may be extracted from a deep layer of a CNN. For example, as described above, the first feature data may be extracted from the penultimate layer (or any desired layer) of HRNet.

Process 400 may continue to action 414, at which the first feature data may be projected into 3D feature data in a voxel space. For example, an inverse image projection method may be used to project the first feature data into 3D feature data in the voxel space. Process 400 may continue to action 416, at which one or more persons represented in the plurality of frames received at action 410 may be detected using a 3D CNN. Process 400 may continue to action 418, at which location data describing locations of the one or more persons in the voxel space may be generated. The 3D CNN may be trained to generate 3D cuboid bounding boxes that surrounds the detected persons. The 3D cuboid bounding boxes may identify the location of the detected persons in the voxel grid.

Process 400 may continue to action 420, at which the first feature data and the location data may be sent to a 4D CNN effective to generate second feature data comprising 3D representations of the one or more persons over time. For example, 4D CNN 211 may perform the tesseract convolutions described above. The input into 4D CNN 211 may be the output of the feature data extracted from HRNet (or another backbone network) that is projected into 3D at each time stamp (e.g., using inverse image projection). Additionally, the location data comprising person detections 208, may be provided to the 4D CNN 211. The output of the 4D CNN 211 may be a reduced size tesseract feature. These features represent a spatio-temporal descriptor of a person centered around a detection. This bottleneck descriptor (e.g., the second feature data) is used in both the person tracking network 210 and pose estimation module (FIG. 2).

Processing may continue at action 421, at which the representations of the same person may be matched across time steps to track the individual. The process for matching person representations is described above in reference to FIG. 3.

Processing may continue to action 422, at which merged feature data may be generated based at least in part on merging the second feature data over time. Although not described in reference to FIG. 4, attention aggregation 212 may first be used to sharpen the features to incorporate spatio-temporal context into the features. Additionally, matching 214 may be used to match persons over time. At action 422, the spatio-temporal descriptor features may be merged for each person. These spatio-temporal descriptor features encode the person's pose and motion over a time interval. The descriptors may be merged to estimate the person's pose at their common time.

Processing may continue to action 424, at which deconvolution operations may be performed on the merged feature data to generate 3D pose information for the one or more persons over time using the deconvolution 218. As described above, the deconvolution 218 may generate a vector of 3D heatmaps of each person's joints at time t.

Figure 5:
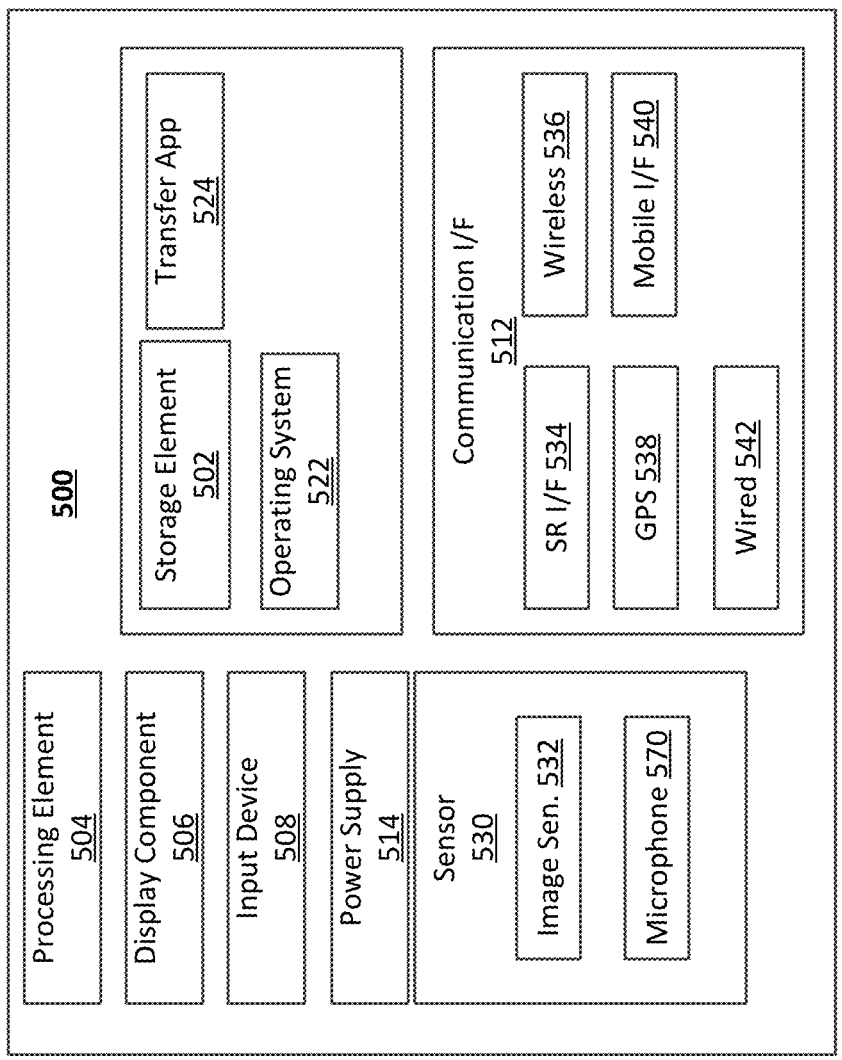
FIG. 5 is a block diagrams showing an example architecture of a computing device that may be used in accordance with various embodiments described herein.

FIG. 5 is a block diagram showing an example architecture 500 of a computing device that may be used for multi-person articulated 3D pose tracking, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store parameters, and/or machine learning models generated using the various techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display 3D pose tracking heatmaps generated in accordance with the various techniques described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more position sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing device(s) 102, as described herein, are exemplary, and may be located as a stand-alone device or may be included, in whole or in part, as a component of a larger device or system.

Figure 6:
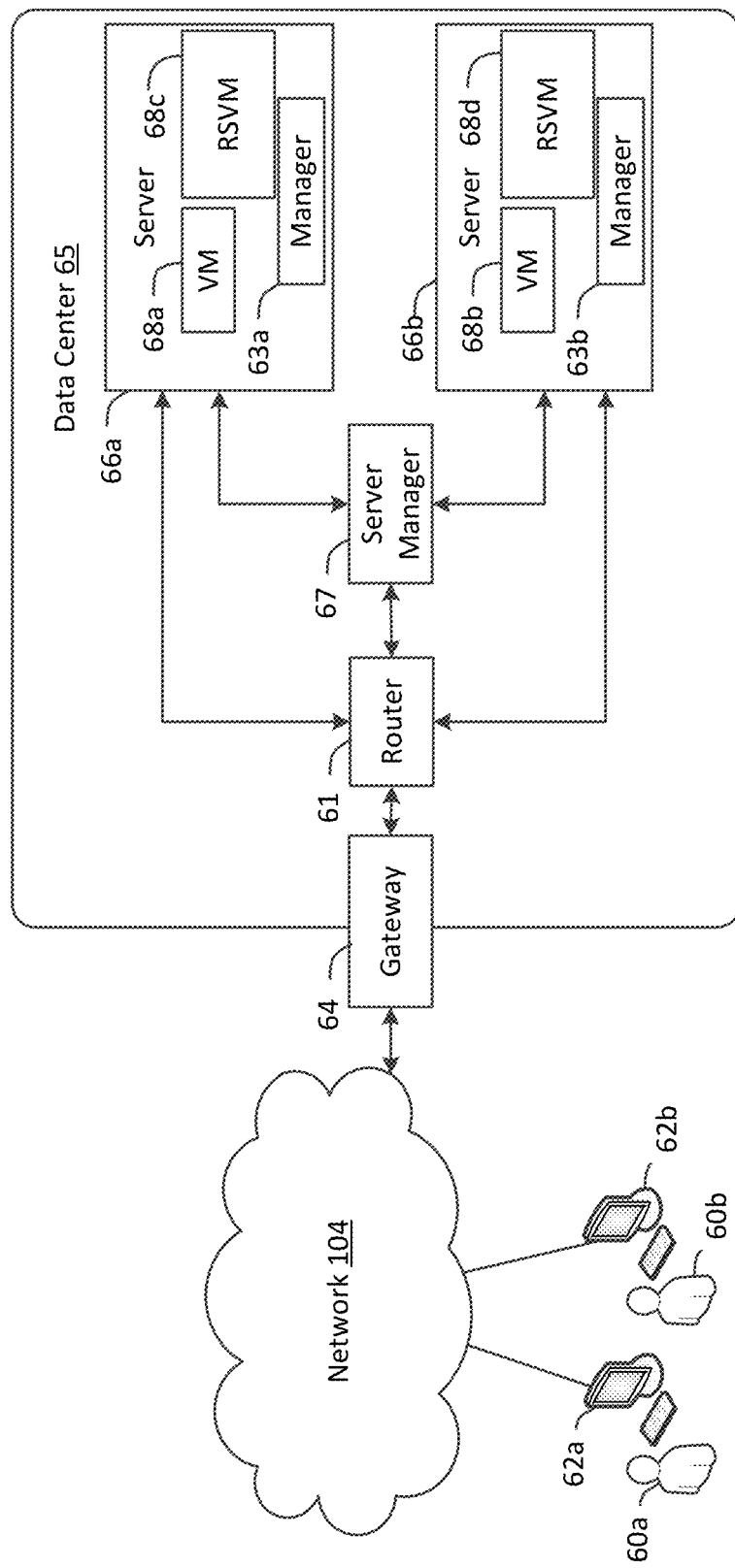
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. For example, the computing environment of FIG. 6 may be used to provide multi-person articulated 3D pose tracking as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60*a* and 60*b* (which may be referred herein singularly as user 60 or in the plural as users 60) via user computers 62*a* and 62*b* (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various multi-person articulated 3D pose tracking techniques described herein.

These services may be configurable with set or custom applications and may be configurable in size, execution, cost, latency, type, duration, accessibility and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66*a* and 66*b* (which may be referred herein singularly as server 66 or in the plural as servers 66) that provide computing resources. These resources may be available as bare metal resources or as virtual machine instances 68*a-d* (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution systems (such as application server instances, Java™ virtual machines (JVMs), general-purpose or special-purpose operating systems that support various interpreted or compiled programming languages such as Ruby, Perl, Python, C, C++ and the like or high-performance computing systems) suitable for the applications, without, for example, requiring the client to access an instance or an execution system directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware system, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. An end-to-end method of articulated three-dimensional pose tracking comprising:
   receiving, from one or more cameras, a plurality of frames of image data;
   extracting first feature data representing the plurality of frames of image data from a first backbone convolutional neural network (CNN);
   projecting the first feature data into three-dimensional (3D) feature data in a voxel space;
   detecting a first person represented in one or more of the plurality of frames of image data using a 3D CNN;
   generating location data describing a location of the first person in the voxel space;
   sending the first feature data and the location data to a four-dimensional (4D) CNN effective to generate second feature data comprising a 3D representation of the first person over time;
   generating merged feature data based at least in part on merging the second feature data over time; and
   performing one or more deconvolution operations on the merged feature data to generate 3D pose information for the first person over time.

2. The method of claim 1, further comprising:
   determining, for the first person represented in the second feature data, spatial contextual information using an attention mechanism; and
   determining, for the first person represented in the second feature data, temporal contextual information using the attention mechanism, wherein the merged feature data comprises the spatial contextual information and the temporal contextual information.

3. The method of claim 1, further comprising:
   determining, using the second feature data, a similarity between a first feature representation of the first person at time t and a second feature representation of the first person at time t+Δt;
   determining, using the similarity, that the first feature representation and the second feature representation correspond to the same person; and
   generating matching data indicating that the first feature representation and the second feature representation correspond to the same person, wherein the merged feature data comprises combined representations of feature representations of the same person.

4. A method comprising:
   receiving a plurality of frames of image data captured by one or more cameras;
   determining first feature data representing the plurality of frames of image data using a backbone network;
   projecting the first feature data into three-dimensional (3D) space;
   determining 3D location data describing respective 3D locations of one or more persons represented by the first feature data projected in the 3D space;
   sending the first feature data and the 3D location data to a four-dimensional (4D) convolutional neural network (CNN);
   generating, by the 4D CNN, second feature data comprising respective 3D representations of the one or more persons based on context from frames of the plurality of frames representing different points in time; and
   generating 3D pose data representing articulated 3D pose information for the one or more persons.

5. The method of claim 4, further comprising:
   determining, using the second feature data, a similarity between a first feature representation of a person at time t and a second feature representation of the person at time t+Δt;
   determining, using the similarity, that the first feature representation and the second feature representation correspond to the same person; and
   generating matching data indicating that the first feature representation and the second feature representation correspond to the same person, wherein the second feature data comprises combined representations of feature representations of the same person.

6. The method of claim 4, further comprising:
determining the 3D location data using a 3D CNN; and
determining a person detection loss representing differences between ground truth 3D locations of one or more persons represented in the plurality of frames of image data and the 3D location data.

7. The method of claim 4, further comprising generating merged feature data based at least in part on merging the second feature data over multiple time steps represented by the plurality of frames of image data.

8. The method of claim 7, further comprising generating the 3D pose data representing articulated 3D pose information for the one or more persons over time based at least in part on performing one or more deconvolution operations on the merged feature data.

9. The method of claim 8, further comprising:
determining a pose prediction loss representing differences between the 3D pose data and ground truth 3D pose data; and
updating parameters of the backbone network and the 4D CNN based at least in part on the pose prediction loss.

10. The method of claim 4, further comprising training at least the backbone network, the 4D CNN, and a 3D person detection CNN configured to generate the 3D location data end-to-end.

11. The method of claim 10, further comprising:
training at least the backbone network, the 4D CNN, and the 3D person detection CNN end-to-end using a person tracking loss related to tracking of persons in the 3D space over time and a pose estimation loss related to the articulated 3D pose information for the one or more persons over time.

12. The method of claim 4, further comprising:
determining, for a first person represented in the second feature data, spatial contextual information using an attention mechanism; and
determining, for the first person represented in the second feature data, temporal contextual information using the attention mechanism, wherein the 3D pose data representing articulated 3D pose information for the one or more persons is generated based at least in part on the spatial contextual information and the temporal contextual information.

13. A system comprising:
at least one processor; and
at least one non-transitory computer-readable memory storing instructions that, when executed by the at least one processor, are effective to program the at least one processor to:
receive a plurality of frames of image data captured by one or more cameras;
determine first feature data representing the plurality of frames of image data using a backbone network;
project the first feature data into three-dimensional (3D) space;
determine 3D location data describing respective 3D locations of one or more persons represented by the first feature data projected in the 3D space;
send the first feature data and the 3D location data to a four-dimensional (4D) convolutional neural network (CNN);
generate, by the 4D CNN, second feature data comprising respective 3D representations of the one or more persons; and
generate 3D pose data representing articulated 3D pose information for the one or more persons.

14. The system of claim 13, the at least one non-transitory computer-readable memory storing further instructions that, when executed by the at least one processor, are further effective to program the at least one processor to:
determine, using the second feature data, a similarity between a first feature representation of a person at time t and a second feature representation of the person at time t+Δt;
determine, using the similarity, that the first feature representation and the second feature representation correspond to the same person; and
generate matching data indicating that the first feature representation and the second feature representation correspond to the same person, wherein the second feature data comprises combined representations of feature representations of the same person.

15. The system of claim 13, the at least one non-transitory computer-readable memory storing further instructions that, when executed by the at least one processor, are further effective to program the at least one processor to:
determine the 3D location data using a 3D CNN; and
determine a person detection loss representing differences between ground truth 3D locations of one or more persons represented in the plurality of frames of image data and the 3D location data.

16. The system of claim 13, the at least one non-transitory computer-readable memory storing further instructions that, when executed by the at least one processor, are further effective to program the at least one processor to generate merged feature data based at least in part on merging the second feature data over multiple time steps represented by the plurality of frames of image data.

17. The system of claim 16, the at least one non-transitory computer-readable memory storing further instructions that, when executed by the at least one processor, are further effective to program the at least one processor to generate the 3D pose data representing articulated 3D pose information for the one or more persons over time based at least in part on performing one or more deconvolution operations on the merged feature data.

18. The system of claim 17, the at least one non-transitory computer-readable memory storing further instructions that, when executed by the at least one processor, are further effective to program the at least one processor to:
determine a pose prediction loss representing differences between the 3D pose data and ground truth 3D pose data; and
update parameters of the backbone network and the 4D CNN based at least in part on the pose prediction loss.

19. The system of claim 13, the at least one non-transitory computer-readable memory storing further instructions that, when executed by the at least one processor, are further effective to program the at least one processor to train at least the backbone network, the 4D CNN, and a 3D person detection CNN configured to generate the 3D location data end-to-end.

20. The system of claim 19, the at least one non-transitory computer-readable memory storing further instructions that, when executed by the at least one processor, are further effective to train at least the backbone network, the 4D CNN, and the 3D person detection CNN end-to-end using a person tracking loss related to tracking of persons in the 3D space over time and a pose estimation loss related to the articulated 3D pose information for the one or more persons over time.

* * * * *